(12) United States Patent
Nakai et al.

(10) Patent No.: US 9,350,049 B2
(45) Date of Patent: May 24, 2016

(54) ELECTRIC STORAGE DEVICE AND ELECTRIC STORAGE APPARATUS

(71) Applicant: GS Yuasa International Ltd, Kyoto (JP)

(72) Inventors: Kenta Nakai, Kyoto (JP); Takeshi Sasaki, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 14/555,946

(22) Filed: Nov. 28, 2014

(65) Prior Publication Data

US 2015/0147625 A1 May 28, 2015

(30) Foreign Application Priority Data

Nov. 28, 2013 (JP) ................................. 2013-246074
Sep. 30, 2014 (JP) ................................. 2014-200547

(51) Int. Cl.
| | |
|---|---|
| *H01M 10/0567* | (2010.01) |
| *H01M 10/052* | (2010.01) |
| *H01M 2/20* | (2006.01) |
| *H01M 10/0525* | (2010.01) |
| *H01M 10/42* | (2006.01) |

(52) U.S. Cl.
CPC .......... *H01M 10/0567* (2013.01); *H01M 2/204* (2013.01); *H01M 2/206* (2013.01); *H01M 10/052* (2013.01); *H01M 10/0525* (2013.01); *H01M 10/4235* (2013.01); H01M 2300/0025 (2013.01)

(58) Field of Classification Search
None
See application file for complete search history.

(56) References Cited

U.S. PATENT DOCUMENTS

| | | | |
|---|---|---|---|
| 2008/0268340 A1 | 10/2008 | Kuwahara et al. | |
| 2010/0151329 A1 | 6/2010 | Sato et al. | |
| 2012/0094177 A1* | 4/2012 | Honoki ............... | H01M 4/0404 429/211 |
| 2012/0156529 A1* | 6/2012 | Watanabe ........... | H01M 10/052 429/50 |
| 2014/0087270 A1 | 3/2014 | Yoshida | |

FOREIGN PATENT DOCUMENTS

| | | |
|---|---|---|
| EP | 2 475 042 A | 7/2012 |
| JP | 2001-167767 A | 6/2001 |
| JP | 2001-307773 A | 11/2001 |
| JP | 2001-307774 A | 11/2001 |
| JP | 2001-338692 A | 12/2001 |

(Continued)

OTHER PUBLICATIONS

Extended European Search Report dated May 4, 2015.

*Primary Examiner* — Gregg Cantelmo
(74) *Attorney, Agent, or Firm* — McGinn IP Law Group, PLLC

(57) ABSTRACT

The electric storage device includes: an electrode assembly; and an electrolytic solution at least part of which is impregnated into the electrode assembly, wherein the electrode assembly includes, as electrode assembly forming members, at least a positive electrode and a negative electrode that face each other, and contains lithium carbonate, the electrolytic solution contains at least lithium hexafluorophosphate, at least one of the positive electrode and the negative electrode includes an active material layer containing a metal compound, the active material layer includes a peripheral area and an inner area inside the peripheral area, the electrode assembly includes a high-content part the ratio of lithium carbonate content of which is higher than that of the inner area.

13 Claims, 11 Drawing Sheets

(56) References Cited

FOREIGN PATENT DOCUMENTS

| JP | 2003-092146 A | 3/2003 |
| JP | 2007-103134 A | 4/2007 |
| JP | 2008-117758 A | 5/2008 |
| JP | 2010199035 A * | 9/2010 |
| JP | 2012-119183 A | 6/2012 |
| JP | 2013-037774 A | 2/2013 |
| JP | 5578280 B2 | 8/2014 |
| WO | WO 2011/121691 A1 | 10/2011 |

* cited by examiner

ELECTRIC STORAGE DEVICE AND ELECTRIC STORAGE APPARATUS

CROSS-REFERENCE TO RELATED APPLICATIONS

This application claims the benefit of Japanese Patent Application Nos. 2013-246074 and 2014-200547, filed on Nov. 28, 2013 and Sep. 30, 2014, respectively, which are incorporated herein by reference.

FIELD

The present invention relates to an electric storage device and an electric storage apparatus.

BACKGROUND

Conventionally, various types of electric storage devices have been known. For example, an electric storage device including an electrode assembly including a pair of mutually opposed electrodes, and an electrolytic solution impregnated into the electrode assembly has been known. In this electric storage device, the positive electrode of the electrode pair includes a positive-electrode active material layer containing a positive-electrode active material, and the negative electrode of the electrode pair includes a negative-electrode active material layer containing a negative-electrode active material.

As this type of electric storage device, there is known, for example, an electric storage device in which an electrolytic solution contains lithium hexafluorophosphate ($LiPF_6$) serving as electrolytic salt, and a positive-electrode active material layer contains lithium carbonate and lithium metal oxide serving as a positive-electrode active material (JP 2001-167767 A).

In such an electric storage device, an acidic substance which causes metal contained in a positive-electrode active material to liquate out into the electrolytic solution is produced from $LiPF_6$. The acidic substance produced from $LiPF_6$ can be neutralized, however, by the basic lithium carbonate. Accordingly, the metal contained in the positive-electrode active material can be suppressed or prevented from being liquated out into the electrolytic solution by the acidic substance. Consequently, it is possible to suppress or prevent battery capacity from degrading after high-temperature storage.

In such an electric storage device, however, a gas is generated due to the reaction between the acidic substance produced from $LiPF_6$ and the lithium carbonate. Since the lithium carbonate is simply dispersed in the positive-electrode active material layer in the electric storage device, such a gas is also generated inside the electrode assembly and may accumulate therein. If the gas accumulates inside the electrode assembly, the electric storage device, after being stored at particularly high temperature, may increase in resistance or decrease in electric capacity.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is an object of the present invention to provide an electric storage device the capacity degradation and resistance increase of which after high-temperature storage are suppressed or prevented, and an electric storage apparatus including the electric storage device.

An electric storage device according to an aspect of the present invention includes: an electrode assembly; and an electrolytic solution at least part of which is impregnated into the electrode assembly, wherein the electrode assembly includes, as electrode assembly forming members, at least a positive electrode and a negative electrode that face each other, and contains lithium carbonate, the electrolytic solution contains at least lithium hexafluorophosphate, at least one of the positive electrode and the negative electrode includes an active material layer containing a metal compound, the active material layer includes a peripheral area and an inner area inside the peripheral area, the electrode assembly includes a high-content part the ratio of lithium carbonate content of which is higher than that of the inner area, and the high-content part is formed in at least part of the peripheral area of the active material layer or in at least part of the electrode assembly forming members of the electrode assembly facing the peripheral area of the active material layer in a layer thickness direction thereof.

BRIEF DESCRIPTION OF THE DRAWINGS

The foregoing and other features of the present invention will become apparent from the following description and drawings of an illustrative embodiment of the invention in which.

DESCRIPTION OF EMBODIMENTS

Figure 1:
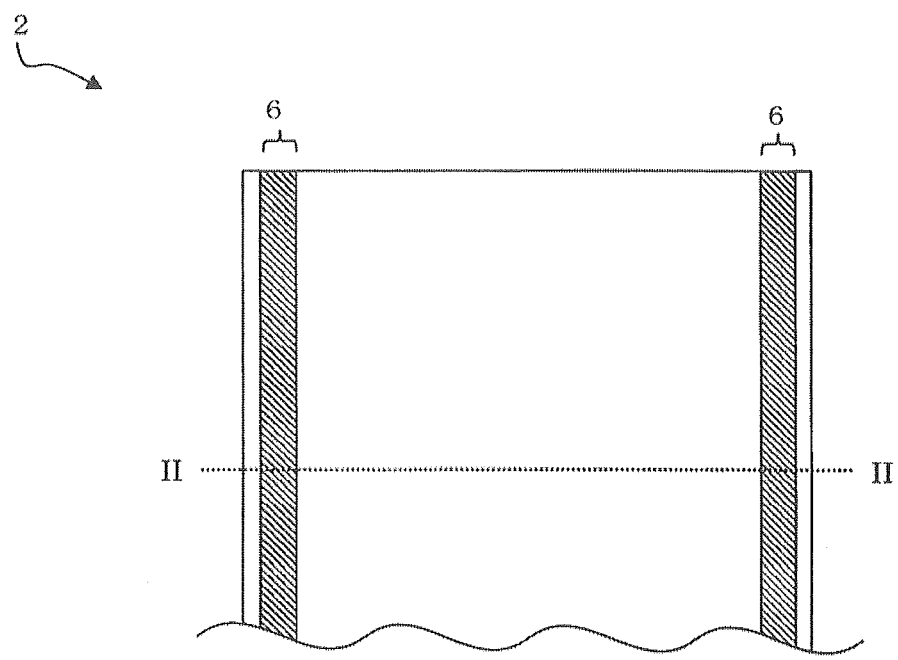
FIG. 1 is a schematic view diagrammatically representing the condition in which part of an electrode assembly before being wound is viewed from one side thereof.

An electric storage device according to an aspect of the present invention includes: an electrode assembly; and an electrolytic solution at least part of which is impregnated into the electrode assembly, wherein the electrode assembly includes, as electrode assembly forming members, at least a positive electrode and a negative electrode that face each other, and contains lithium carbonate, the electrolytic solution contains at least lithium hexafluorophosphate, at least one of the positive electrode and the negative electrode includes an active material layer containing a metal compound, the active material layer includes a peripheral area and an inner area inside the peripheral area, the electrode assembly includes a high-content part the ratio of lithium carbonate content of which is higher than that of the inner area, and the high-content part is formed in at least part of the peripheral area of the active material layer or in at least part of the electrode assembly forming members of the electrode assembly facing the peripheral area of the active material layer in a layer thickness direction thereof.

In the electric storage device of the above-described embodiment, the capacity degradation of the electric storage device after high-temperature storage is suppressed or prevented. This is assumed to be due to the below-described mechanism. That is, although an acidic substance may be generated from lithium hexafluorophosphate (LiPF$_6$) in the electrolytic solution impregnated into the electrode assembly, the acidic substance can be neutralized with lithium carbonate. Accordingly, the metal of the metal compound is considered to be suppressed or prevented by the acidic substance from liquating out. Thus, the capacity degradation of the electric storage device after the electric storage device is stored at high temperature is assumed to be suppressed or prevented as the result of the metal being suppressed or prevented from liquating out.

In addition, resistance increase after high-temperature storage is suppressed or prevented in the electric storage device of the above-described embodiment. This is assumed to be due to the below-described mechanism. That is, the high-content part is present in at least part of the peripheral area of the active material layer or in at least part of the electrode assembly forming members of the electrode assembly facing the peripheral area of the active material layer in the layer thickness direction thereof. Accordingly, a gas is liable to be generated in the high-content part due to the reaction between the lithium carbonate and the acidic substance. Since a gas arising near the high-content part is generated in the vicinity of the peripheral area of the active material layer, however, the gas is more likely to be released out of the electrode assembly than a gas generated inside the electrode assembly. Consequently, the gas is considered to be suppressed or prevented from accumulating in the vicinity of the peripheral area of the active material layer. Thus, the resistance increase of the electric storage device after the electric storage device is stored at high temperature is assumed to be suppressed or prevented as the result of the gas being suppressed or prevented from accumulation.

As described above, the present embodiment suppresses the capacity degradation and resistance increase after high-temperature storage.

According to an aspect of the present invention, the electric storage device may have a configuration, in which the electric storage device further includes a case housing the electrode assembly therein, an excess electrolytic solution serving as part of the electrolytic solution is reserved within the case, and at least part of the high-content part is in contact with the excess electrolytic solution. The excess electrolytic solution refers to a portion of the electrolytic solution injected into the case which is not impregnated into the electrode assembly but reserved within the case as a liquid to form a fluid level.

In the electric storage device of such an aspect, the amount of impregnated electrolytic solution is larger in the high-content part being in contact with the excess electrolytic solution than in the electrode assembly being not in contact with the excess electrolytic solution. Accordingly, a metal compound constituting an active material and an LiPF$_6$-derived acidic substance in the excess electrolytic solution are liable to react with each other in the high-content part being in contact with the excess electrolytic solution. Since the ratio of lithium carbonate content is higher in the high-content part than in the inner area, however, the LiPF$_6$-derived acidic substance is neutralized all the more securely due to the high ratio of lithium carbonate content. Consequently, it is possible to suppress or prevent the metal of the metal compound of the active material layer from being liquated out by the LiPF$_6$-derived acidic substance even if the high-content part is in contact with the excess electrolytic solution. Thus, the capacity degradation after the electric storage device is stored at high temperature is assumed to be suppressed or prevented as the result of the metal being suppressed or prevented from liquating out.

In addition, in the electric storage device of such an aspect, even if the LiPF6-derived acidic substance and the lithium carbonate react with each other in the high-content part being in contact with the excess electrolytic solution, a gas thus generated moves to the excess electrolytic solution and is therefore unlikely to accumulate inside the electrode assembly. Accordingly, even if the ratio of lithium carbonate content of the high-content part is higher, the generated gas is suppressed or prevented accumulating inside the electrode assembly. Thus, resistance increase after the electric storage device is stored at high temperature is assumed to be suppressed or prevented as the result of the gas being suppressed or prevented from accumulating inside the electrode assembly.

According to another aspect of the present invention, the electric storage device may have a configuration, in which the positive electrode includes a positive-electrode active material layer serving as the active material layer, and the high-content part is formed in at least part of the peripheral area of the positive-electrode active material layer.

The electric storage device of such an aspect can more effectively suppress or prevent the capacity degradation and resistance increase after high-temperature storage. This is assumed to be due to the below-described mechanism. That is, at least part of the peripheral area of the positive-electrode active material layer includes the high-content part containing a larger amount of lithium carbonate, and therefore, the metal compound and the lithium carbonate come closer to each other. Thus, metal is considered able to be more securely prevented by the lithium carbonate from being liquated out by the LiPF$_6$-derived acidic substance. It is also considered that since a gas arising near the high-content part is generated in the vicinity of the peripheral area of the positive-electrode active material layer, the gas is more likely to be released out of the electrode assembly than a gas generated inside the electrode assembly. That is, the gas is considered to be less likely to accumulate in the vicinity of the peripheral area of the positive-electrode active material layer. Thus, resistance increase after the electric storage device is stored at high temperature is assumed to be more effectively suppressed or prevented as the result of the gas being more effectively prevented from accumulation.

According to yet another aspect of the present invention, the electric storage device may have a configuration, in which the ratio of lithium carbonate content of the high-content part is 0.02 mg/cm$^2$ or higher but no higher than 0.2 mg/cm$^2$.

According to still another aspect of the present invention, the electric storage device may have a configuration, in which the electrode assembly is rectangular in shape when viewed from one side thereof and includes a pair of high-content parts, and the pair of high-content parts are respectively disposed along opposed sides of the electrode assembly.

The phrase "viewed from one side" refers to viewing the electrode assembly along the normal-line direction of an electrode assembly forming member, such as a positive electrode or a negative electrode.

According to still another aspect of the present invention, the electric storage device may have a configuration, in which the peripheral area of the active material layer is an area, greater than 0 and 10 mm or less in width, extending inward from the peripheral edges of the active material layer.

Hereinafter, an aspect of the electric storage device according to an embodiment of the present invention is described with reference to the attached drawings. Note that in the drawings to be discussed hereafter, identical or corresponding constituent elements are denoted by the same or corresponding reference numerals and characters and will not be described again.

As shown in FIG. 1 to FIG. 10, an electric storage device according to the present embodiment: includes an electrode assembly 2; and an electrolytic solution at least part of which is impregnated into the electrode assembly, wherein the electrode assembly 2 includes, as electrode assembly forming members, at least a positive electrode 3 and a negative electrode 4 that face each other, and contains lithium carbonate, the electrolytic solution contains at least lithium hexafluorophosphate, at least one of the positive electrode 3 and the negative electrode 4 includes an active material layer containing a metal compound, the active material layer includes a peripheral area A and an inner area B inside the peripheral area A, the electrode assembly 2 includes a high-content part 6 the ratio of lithium carbonate content of which is higher than that of the inner area B, and the high-content part 6 is formed in at least part of the peripheral area A of the active material layer or in at least part of the electrode assembly forming members of the electrode assembly 2 facing the peripheral area A of the active material layer in a layer thickness direction thereof.

In the electric storage device 1 of the present embodiment, the ratio of lithium carbonate content is lower in the inner area of the active material layer than in the high-content part. Accordingly, gas generation caused by the reaction between lithium carbonate and an acidic substance is all the more suppressed or prevented in the inner area of the active material layer, compared with a case where the ratio of lithium carbonate content is uniform, due to the ratio of lithium carbonate content being low in the inner area of the active material layer. In the electric storage device 1 of the present embodiment, a gas is therefore suppressed or prevented from accumulating inside the electrode assembly. For this reason, resistance increase after the electric storage device is stored at high temperature is assumed to be suppressed or prevented.

Figure 2:
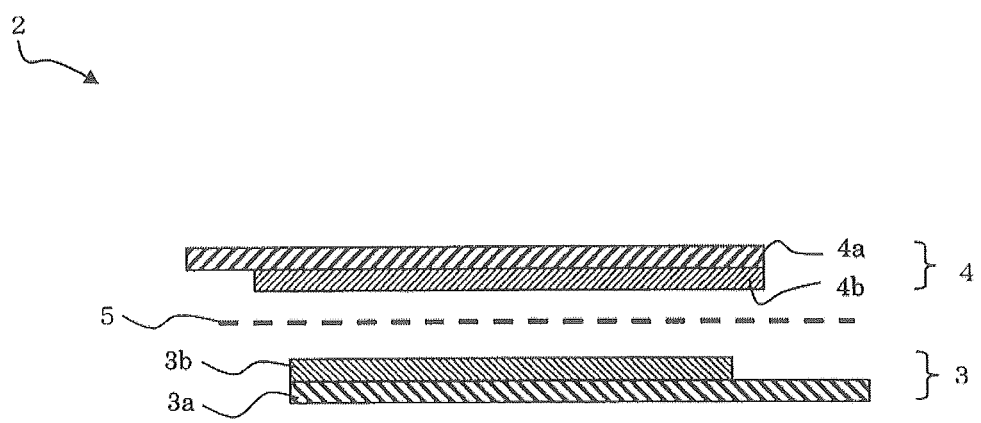
FIG. 2 is a cross-sectional view diagrammatically showing the II-II cross section of FIG. 1.

Specifically, as shown in, for example, FIG. 2, the electric storage device 1 of the present embodiment includes a sheet-shaped separator 5 disposed between the positive electrode 3 and the negative electrode 4 as an electrode assembly forming member of the electrode assembly 2.

In addition, the electric storage device 1 of the present embodiment includes a case 7 housing the electrode assembly 2 therein. The electric storage device 1 of the present embodiment includes an excess electrolytic solution 8 reserved within the case 7 and an electrolytic solution impregnated into the electrode assembly 2 as an electrolytic solution. At least part of the high-content part 6 is in contact with the excess electrolytic solution 8.

Figure 6:
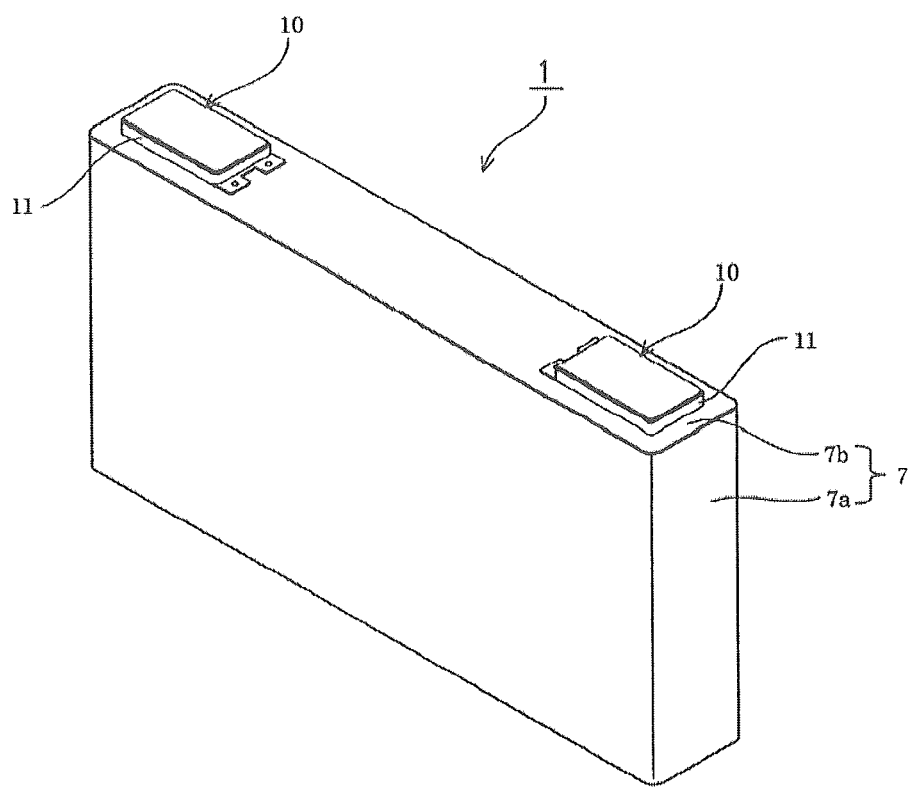
FIG. 6 is a schematic view showing the external appearance of a nonaqueous electrolyte secondary battery cell (lithium-ion secondary battery cell) serving as an electric storage device.

Examples of the electric storage device 1 of the present embodiment include the nonaqueous electrolyte secondary battery 1 (lithium-ion secondary battery cell) shown in, for example, FIG. 6.

As the electrode assembly 2, a stack of the positive electrode 3, the negative electrode 4 and the separators 5, for example, is used in a state of being wound. The electrode assembly 2 before being wound is formed into a belt-like shape, as shown in FIG. 1. The wound electrode assembly 2 is formed into a flattened shape, as shown in, for example, FIG. 5.

As shown in, for example, FIG. 1 to FIG. 5, the electrode assembly 2 includes the sheet-shaped positive electrode 3, the sheet-shaped negative electrode 4, and the sheet-shaped separator 5 disposed between the positive electrode 3 and the negative electrode 4.

As shown in, for example, FIG. 2, the positive electrode 3 includes a sheet-shaped positive-electrode current-collecting base material 3a, and a positive-electrode active material layer 3b disposed on at least one surface side of the positive-electrode current-collecting base material 3a and containing a particulate positive-electrode active material.

The thickness of the positive electrode 3 is normally 35 to 250 μm. The thickness of the positive-electrode current-collecting base material 3a is normally 5 to 50 μm, whereas the thickness of the positive-electrode active material layer 3b is normally 30 to 200 μm.

On the other hand, the negative electrode 4 includes a sheet-shaped negative-electrode current-collecting base material 4a, and a negative-electrode active material layer 4b disposed on at least one surface side of the negative-electrode current-collecting base material 4a and containing a particulate negative-electrode active material.

The thickness of the negative electrode 4 is normally 35 to 250 μm. In addition, the thickness of the negative-electrode current-collecting base material 4a is normally 5 to 50 μm, whereas the thickness of the negative-electrode active material layer 4b is normally 30 to 200 p.m.

As shown in FIG. 2, the positive electrode 3 and the negative electrode 4 are layered over each other to allow the positive-electrode active material layer 3b and the negative-electrode active material layer 4b to face each other.

As shown in, for example, FIG. 2, both end edges of the negative-electrode active material layer 4b in the width direction thereof are respectively located outside both end edges of the positive-electrode active material layer 3b.

Such a configuration makes it possible to securely occlude Li ions migrating from the positive-electrode active material layer 3b to the negative electrode 4 during charging in the negative-electrode active material layer 4b.

In addition, one end edge in the width direction of the positive-electrode current-collecting base material 3a is located outside one end edge of the positive-electrode active material layer 3b. In the negative electrode 4 facing the other side in the width direction of the positive-electrode current-collecting base material 3a, the end edge of the negative-electrode current-collecting base material 4a is located outside the end edge of the negative-electrode active material layer 4b.

That is, on one side in the width direction of the belt-shaped electrode assembly 2, the positive-electrode current-collecting base material 3a protrudes outward from the end edge of the positive-electrode active material layer 3b. On the other side in the width direction of the belt-shaped electrode assembly 2, the negative-electrode current-collecting base material 4a protrudes outward from the end edge of the negative-electrode active material layer 4b.

Figure 5:
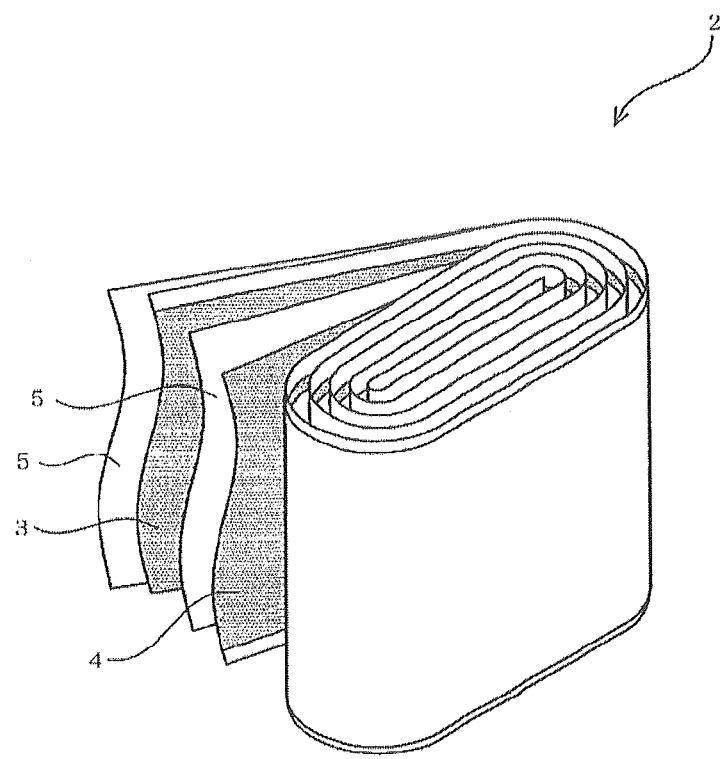
FIG. 5 is a schematic view diagrammatically showing the external appearance of a wound electrode assembly.
Figure 7:
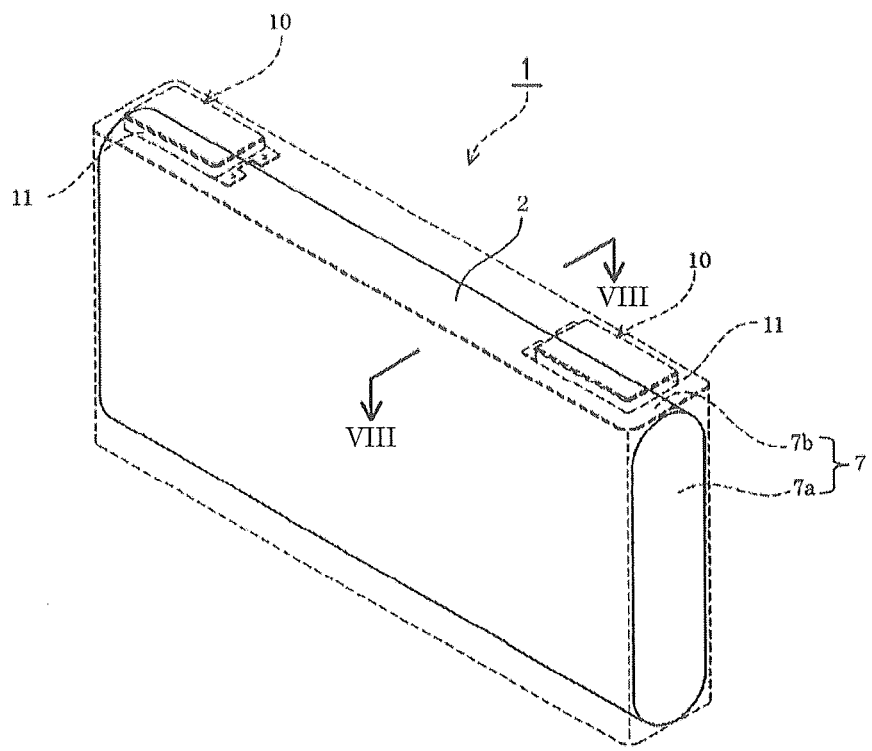
FIG. 7 is a schematic view diagrammatically showing the interiors of a case of the nonaqueous electrolyte secondary battery cell (lithium-ion secondary battery cell)
Figure 8:
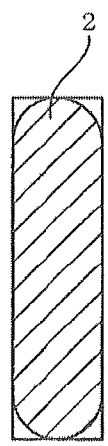
FIG. 8 is a schematic view diagrammatically representing the VIII-VIII cross section of FIG. 7.

As shown in, for example, FIG. 5, FIG. 7 and FIG. 8, the wound electrode assembly 2 can be housed in the case 7.

The electrode assembly 2 is not limited to an electrode assembly of a wound type, however. Alternatively, the electrode assembly 2 may be of a type in which a plurality of positive electrodes, a plurality of separators, a plurality of negative electrodes and a plurality of separators are housed in the case 7 in a state of being layered over one another in this order.

The positive-electrode active material contains a metal compound capable of contributing to electrode reactions, i.e., a charge reaction and a discharge reaction in the positive electrode 3.

The positive-electrode active material is normally formed in a particulate shape.

The metal compound contained in the positive-electrode active material is not limited in particular. Examples of the metal compound include lithium composite oxides, such as lithium nickelate ($LiNiO_2$), spinel lithium manganate ($LiMn_2O_4$), and lithium cobaltate ($LiCoO_2$).

Examples of such a metal compound also include olivine-type phosphoric acid metallic lithium, such as iron lithium phosphate.

As constituent components, the positive-electrode active material layer 3b may contain a conductive agent, a binding agent, a thickening agent, a filler and the like, as necessary.

The conductive agent is not limited in particular. Examples of the conductive agent include natural graphite (squamiform graphite, scale-shaped graphite, earthy graphite, and the like), artificial graphite, carbon black, acetylene black, ketjen black, carbon whisker, carbon fiber, metal (copper, nickel, aluminum, silver, gold, and the like) powder, metal fiber, and conductive ceramics.

As the conductive agent, there is adopted, for example, one of the abovementioned materials alone, or a mixture of two or more of the materials.

The binding agent is not limited in particular. Examples of the binding agent include thermoplastic resin, such as polytetrafluoroethylene (PTFE), polyvinylidene fluoride (PVDF), polyethylene and polypropylene, ethylene-propylene-diene terpolymer (EPDM), sulfonated EPDM, styrene-butadiene rubber (SBR), and fluorine rubber.

As the binding agent, there is adopted, for example, one of the abovementioned materials alone, or a mixture of two or more of the materials.

The thickening agent is not limited in particular. Examples of the thickening agent include polysaccharides, such as carboxymethyl cellulose and methylcellulose.

As the thickening agent, there is adopted, for example, one of the abovementioned materials alone, or a mixture of two or more of the materials.

The filler is not limited in particular. Examples of the filler include olefin-based polymer, such as polypropylene and polyethylene, amorphous silica, alumina, and zeolite.

As the material of the positive-electrode current-collecting base material 3a, there is adopted, for example, an aluminum-based metal material, such as aluminum or aluminum alloy.

Examples of the material of the positive-electrode current-collecting base material 3a include calcined carbon and conductive polymer, in addition to metal.

The positive-electrode current-collecting base material 3a normally has a sheet-like shape.

Examples of the positive-electrode current-collecting base material 3a include metal foil.

The negative-electrode active material is a substance capable of contributing to electrode reactions, i.e., a charge reaction and a discharge reaction in the negative electrode 4.

Examples of the negative-electrode active material include at least one of a carbonaceous material, lithium metal, an alloy capable of occluding and releasing lithium ions (lithium alloys and the like), metal oxide represented by the general formula $MO_z$ (M denotes at least one element selected from the group consisting of W, Mo, Si, Cu and Sn, and z denotes a numeric value within the range $0<z\leq2$), lithium metal oxide ($Li_4Ti_5O_{12}$ and the like), and a polyphosphate compound.

Examples of the carbonaceous material include at least one of black lead (graphite) and amorphous carbon.

Examples of the amorphous carbon include non-graphitizable carbon (hard carbon) and graphitizable carbon (soft carbon).

Examples of the alloy capable of occluding and releasing lithium ions include at least one lithium alloy, among a lithium-aluminum alloy, a lithium-lead alloy, a lithium-tin alloy, a lithium-aluminum-tin alloy and lithium-gallium alloy, or wood's metal.

Like the positive-electrode active material layer 3b, the negative-electrode active material layer 4b may, as necessary, contain the abovementioned binding agent, thickening agent, filler and the like as constituent components.

Examples of the material of the negative-electrode current-collecting base material 4a include metals, such as copper, nickel, iron, stainless steel, titanium and aluminum.

Examples of the material of the negative-electrode current-collecting base material 4a also include calcined carbon and conductive polymer, in addition to metals.

Examples of the negative-electrode current-collecting base material 4a include foils of the abovementioned metals.

The separator 5 is disposed between the positive-electrode active material layer 3b of the positive electrode 3 and the negative-electrode active material layer 4b of the negative electrode 4.

Examples of the separator 5 include a separator composed of a porous film, unwoven cloth, or the like. The separator 5 is composed of, for example, a porous film or unwoven cloth alone, or a combination thereof.

Examples of the material of the separator 5 include at least one of polyolefin-based resin, such as polyethylene and polypropylene, polyester-based resin, such as polyethylene terephthalate and polybutylene terephthalate, and fluorine-based resin.

Examples of a preferred separator 5 include a separator 5 formed by coating a surface of a polyolefin-based base material with inorganic particles, such as alumina particles.

Figure 3:
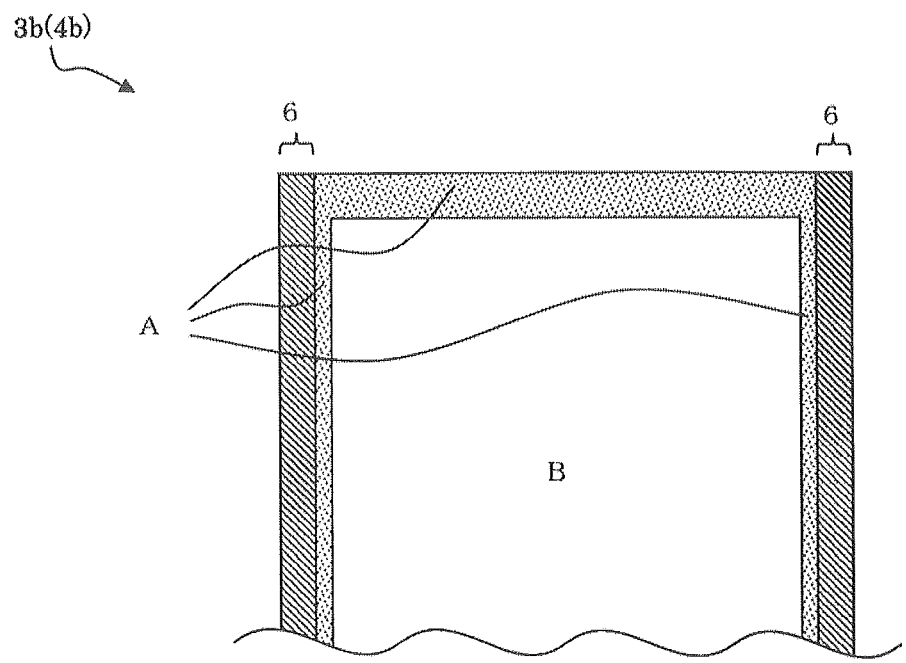
FIG. 3 is a schematic view diagrammatically representing the condition in which part of an active material layer is viewed from one side thereof.

As shown in FIG. 3, the peripheral area A of the active material layer is normally an area, greater than 0 and 10 mm or less in width, extending inward from the peripheral edges of the active material layer when viewed from one surface side thereof.

When the sheet-shaped electrode assembly 2 is wound and housed in the case, the peripheral area A is positioned along the left and right-hand sides of the active material layer shown in FIG. 3 and along the side located in the innermost circumference and the side located in the outermost circumference of the wound active material layer.

When the electrode assembly 2 in which a plurality of the positive electrodes 3, a plurality of the separators 5 and a plurality of the negative electrodes 4 are layered over one another in this order is housed in the case, the peripheral area A is positioned along the left and right-hand sides and the upper and lower sides of the active material layer.

The electrode assembly 2 contains lithium carbonate in at least one of electrode assembly forming members constituting the electrode assembly 2. Specifically, the electrode assembly 2 contains lithium carbonate in at least one of, for example, the positive electrode 3, the negative electrode 4 and the separator 5.

In the electrode assembly 2, an active material layer preferably contains lithium carbonate. More preferably, the positive-electrode active material layer 3b contains lithium carbonate.

Allowing the active material layer to contain lithium carbonate has an advantage of being able to more effectively suppress or prevent an $LiPF_6$-derived acidic substance from liquating out the metal of a metal compound contained in the active material.

Specifically, allowing the positive-electrode active material layer 3b to contain lithium carbonate has an advantage of being able to more effectively prevent the $LiPF_6$-derived acidic substance from liquating out the metal of the metal compound contained in the positive-electrode active material. By more effectively suppressing or preventing metal elution, the capacity degradation after the electric storage device is stored at high temperature is assumed to be more effectively suppressed or prevented.

As shown in, for example, FIG. 3, the high-content parts 6 are formed in at least parts of the peripheral area of the active material layer A.

Each high-content part 6 may be formed in, for example, at least part of the peripheral area A of the positive-electrode active material layer 3b in the positive electrode 3, or in at least part of the peripheral area of the negative-electrode active material layer 4b in the negative electrode 4.

Alternatively, each high-content part 6 may be formed in, for example, at least part of electrode assembly forming members of the electrode assembly facing the peripheral area of the positive-electrode active material layer 3b in the layer thickness direction thereof (at least part of each of the positive-electrode current-collecting base material 3a, the negative-electrode current-collecting base material 4a, the negative-electrode active material layer 4b, and the separator 5 facing the peripheral area of the positive-electrode active material layer 3b in the layer thickness direction thereof).

That is, the ratio of lithium carbonate content of each high-content part 6 is higher than the ratio of lithium carbonate content in the inner area B of an active material layer (normally the positive-electrode active material layer 3b) as the result of the high-content part 6 being formed in part of at least one of the positive-electrode current-collecting base material 3a, the positive-electrode active material layer 3b, the negative-electrode active material layer 4b, the negative-electrode current-collecting base material 4a, and the separator 5.

If the high-content parts 6 are formed in the positive-electrode active material layer 3b, lithium carbonate in the high-content parts 6 preferably distributes disproportionately on the side of the positive-electrode active material layer 3b where the layer 3b is exposed, rather than on the side of the positive-electrode active material layer 3b closer to the positive-electrode current-collecting base material 3a. That is, lithium carbonate in the high-content parts 6 need not distribute uniformly.

Figure 4:
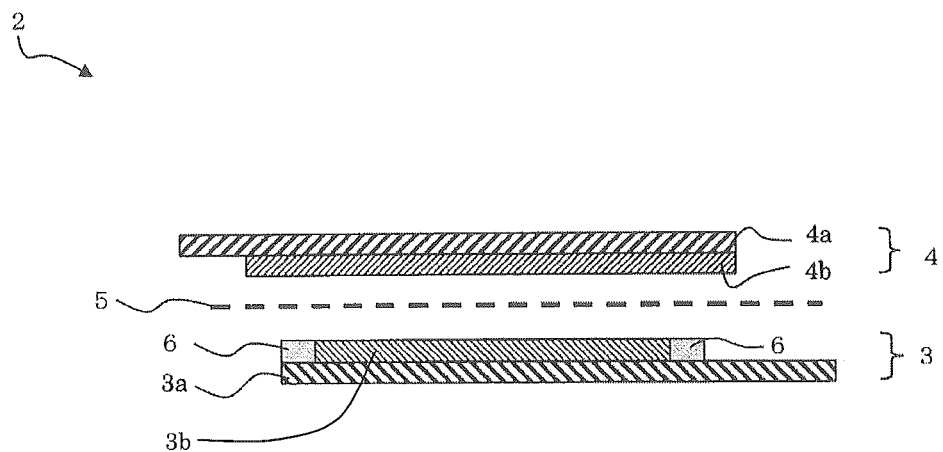
FIG. 4 is a cross-sectional view specifically representing high-content parts in the II-II cross section of FIG. 1.

As shown in, for example, FIG. 3 and FIG. 4, two high-content parts 6 are formed in the positive-electrode active material layer 3b. The two high-content parts 6 are formed along the longitudinal direction of the belt-shaped positive-electrode current-collecting base material 3a, so as to face each other when viewed from one surface side of the positive-electrode active material layer 3b.

Figure 9:
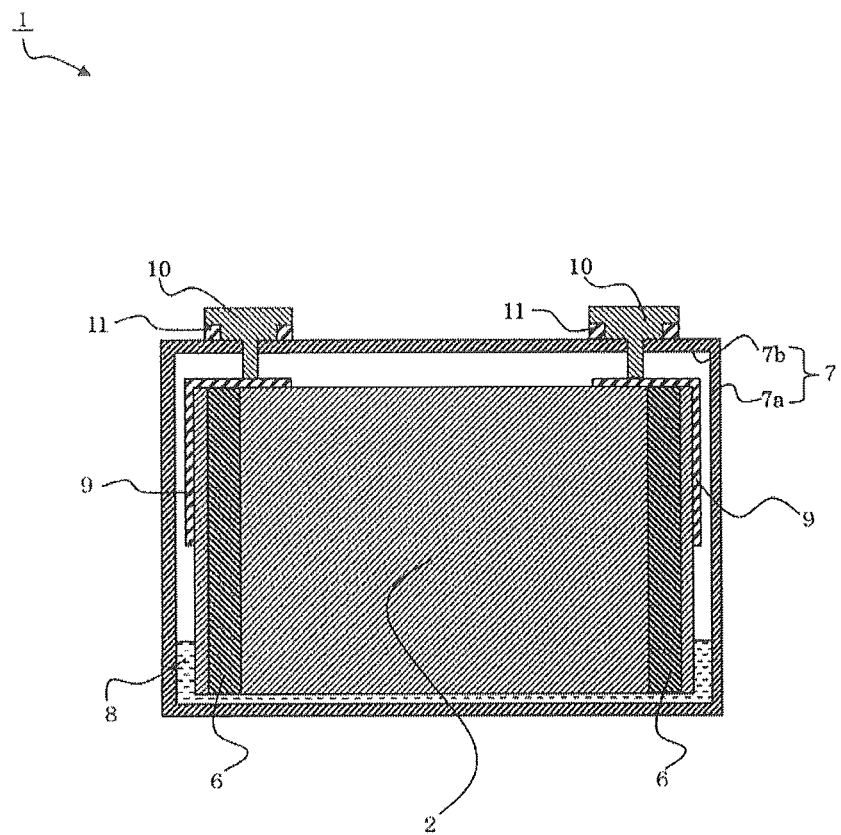
FIG. 9 is a cross-sectional view diagrammatically representing a cross section of the nonaqueous electrolyte secondary battery cell (lithium-ion secondary battery cell) in one state of use.

When the electrode assembly 2 is wound and housed in the case 7, the two high-content parts 6 are disposed along the opposed sides of the electrode assembly 2 in a wound state, so as to face each other, as shown in, for example, FIG. 9.

Each high-content part 6 is preferably formed in at least part of the peripheral area A of the positive-electrode active material layer 3b in the positive electrode 3, as shown in FIG. 3 and FIG. 4. The high-content parts 6 may be formed by coating surfaces of the peripheral area A of the positive-electrode active material layer 3b with a lithium carbonate-containing substance.

Each high-content part 6 is preferably formed on the positive-electrode current-collecting base material 3a and at an end portion of the positive-electrode active material layer 3b in the positive electrode 3, as shown in FIG. 4. At this time, the electrode assembly 2 may include a conductive layer having electrical conductivity between the positive-electrode active material layer 3b and the positive-electrode current-collecting base material 3a. That is, the high-content part 6 need not necessarily be in direct contact with the positive-electrode current-collecting base material 3a, but may be disposed on the positive-electrode current-collecting base material 3a through the conductive layer.

The ratio of lithium carbonate content of each high-content part 6 is preferably 0.02 mg/cm$^2$ or higher but no higher than 0.2 mg/cm$^2$. Setting the ratio of lithium carbonate content of each high-content part 6 to 0.02 mg/cm$^2$ or higher but no higher than 0.2 mg/cm$^2$ has an advantage of being able to more effectively suppress or prevent the capacity degradation and resistance increase after the electric storage device is stored at high temperature. On the other hand, the ratio of lithium carbonate content in areas except the high-content parts 6 is preferably lower than the ratio of lithium carbonate content of the high-content parts 6.

The ratio of lithium carbonate content is determined by the amount of lithium carbonate (mg/cm$^2$) per the unit area of electrode assembly forming members when the electrode assembly 2 is viewed from one side of an active material layer (positive-electrode active material layer 3b) in the layer thickness direction thereof. For example, if the electrode assembly is wound, the electrode assembly is unwound into a belt-shaped electrode assembly 2. Then, the ratio of lithium carbonate content is determined by the amount of lithium carbonate (mg/cm$^2$) per the unit area of electrode assembly forming members when the electrode assembly 2 is viewed from one side of the electrode assembly 2 in the layer thickness direction thereof.

The ratio of lithium carbonate content of the inner area B of the positive-electrode active material layer 3b is determined as described below.

First, a positive electrode 3 is cut out from a region located 10 mm or more inward from an end edge of the positive-electrode active material layer 3b, so that an area of the positive electrode 3 when viewed in the layer thickness direction thereof is 1 cm$^2$. Next, the positive electrode 3 thus cut out is cleaned with a solvent which does not easily dissolve lithium carbonate, and then vacuum-dried. After the positive electrode 3 is vacuum-dried, the mass (mg) of lithium carbonate contained in the positive-electrode active material layer 3b is measured to determine the ratio of lithium carbonate content (mg/cm$^2$) of the inner area B of the positive-electrode active material layer 3b.

The ratio of lithium carbonate content of the end portions of the positive-electrode active material layer 3b is determined as described below.

First, a positive electrode 3 is cut out from an end portion (a region between an end edge of the positive-electrode active material layer 3b and a location 10 mm inward from the end edge), so that an area of the positive electrode 3 when viewed in the layer thickness direction thereof is 1 cm². Next, the positive electrode 3 thus cut out is cleaned with a solvent which does not easily dissolve lithium carbonate, and then vacuum-dried. After the positive electrode 3 is vacuum-dried, the mass (mg) of lithium carbonate contained in the positive-electrode active material layer 3b is measured to determine the ratio of lithium carbonate content (mg/cm²) of the end portion of the positive-electrode active material layer 3b.

The ratio of lithium carbonate content of electrode assembly forming members (portions of the positive-electrode current-collecting base material 3a, the negative-electrode current-collecting base material 4a, the negative-electrode active material layer 4b and the separator 5, disposed in locations facing the end portions of the positive-electrode active material layer 3b in the layer thickness direction thereof) of the electrode assembly 2 facing the end portions of the positive-electrode active material layer 3b in the layer thickness direction thereof is determined as described below.

First, a positive-electrode current-collecting base material 3a, a negative-electrode current-collecting base material 4a, a negative-electrode active material layer 4b and a separator 5 are cut out from the portions of the positive-electrode current-collecting base material 3a, the negative-electrode current-collecting base material 4a, the negative-electrode active material layer 4b and the separator 5, disposed in locations facing the end portions of the positive-electrode active material layer 3b in the layer thickness direction thereof, so that each of the cut areas of the positive-electrode current-collecting base material 3a, the negative-electrode current-collecting base material 4a, the negative-electrode active material layer 4b and the separator 5 when viewed in the layer thickness direction thereof is 1 cm². Next, the electrode assembly forming members thus cut out are cleaned with a solvent which does not easily dissolve lithium carbonate, and then vacuum-dried. The mass (mg) of lithium carbonate contained in the vacuum-dried electrode assembly forming members are measured for each of the members to determine the ratio of lithium carbonate content (mg/cm²) of each of the electrode assembly forming members of the electrode assembly facing the end portions of the positive-electrode active material layer 3b in the layer thickness direction thereof.

In the electric storage device 1 of the present embodiment, end edges of the peripheral area of a metal compound-containing active material layer are exposed as shown in, for example, FIG. 2. Accordingly, the surface area of the peripheral area of the active material layer is larger than the surface area of the inner area of the active material layer due to the end edges being exposed. A reaction between the $LiPF_6$-derived acidic substance and the metal compound is therefore liable to take place in the peripheral area of the active material layer. Since the high-content parts 6 high in the ratio of lithium carbonate content are formed in at least parts of the peripheral area of the active material layer or in at least parts of the electrode assembly forming members of the electrode assembly 2 facing the peripheral area of the active material layer in the layer thickness direction thereof, however, metal elution is suppressed or prevented in the peripheral area of the active material layer where a reaction between the acidic substance and the metal compound is liable to take place. As the result of the elution of metal contained in the active material layer being suppressed or prevented, the capacity degradation after the electric storage device 1 is stored at high temperature is assumed to be suppressed or prevented.

In the electric storage device 1 of the present embodiment, the electrode assembly 2 is formed by closely layering the positive electrode 3, the negative electrode 4 and the separator 5. If a gas is generated inside the electrode assembly 2 in which the positive electrode 3, the negative electrode 4 and the separator 5 are closely layered, the distance between the positive electrode 3 and the negative electrode 4 that face each other increases. Since the high-content parts 6 high in the ratio of lithium carbonate content are formed in at least parts of the peripheral area of the active material layer, or in at least parts of the electrode assembly forming members of the electrode assembly 2 facing the peripheral area of the active material layer in the layer thickness direction thereof, however, it is possible to suppress or prevent an increase in the distance between the positive electrode 3 and the negative electrode 4 that face each other.

Figure 10:
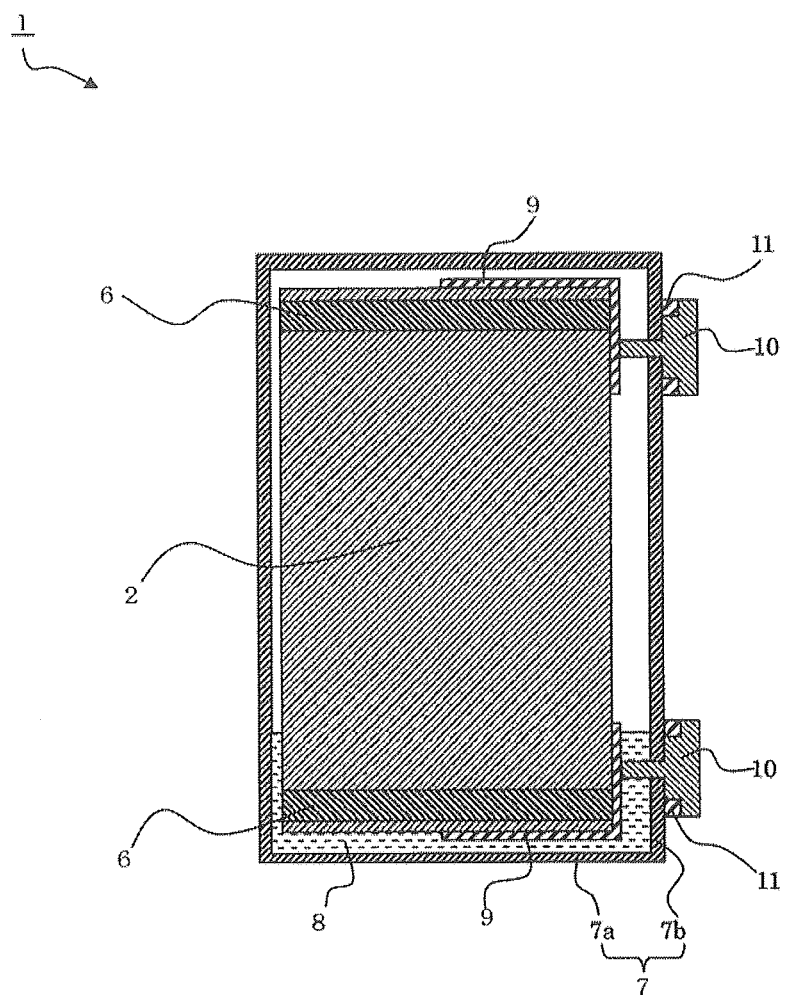
FIG. 10 is a cross-sectional view diagrammatically representing a cross section of the nonaqueous electrolyte secondary battery cell (lithium-ion secondary battery cell) in another state of use.

At least part of the electrolytic solution is impregnated into the electrode assembly 2. The rest of the electrolytic solution not impregnated into the electrode assembly 2 serves as an excess electrolytic solution 8 and is reserved within the case 7, as shown in FIG. 9 and FIG. 10.

The electrolytic solution contains a nonaqueous solvent and at least $LiPF_6$ serving as electrolytic salt.

In general, the electrolytic solution contains $LiPF_6$ at a concentration of 0.5 to 2.0 mol/L.

As the nonaqueous solvent, there is normally adopted a solvent used in electric storage devices and the like.

Specifically, examples of the nonaqueous solvent include cyclic carbonate esters, lactones, chain carbonates, chain esters, ethers, and nitriles.

Examples of cyclic carbonates include propylene carbonate, ethylene carbonate, butylene carbonate, and chloroethylene carbonate.

Examples of lactones include γ-butyrolactone and γ-valerolactone.

Examples of chain carbonates include dimethyl carbonate, diethyl carbonate, and ethyl methyl carbonate.

Examples of chain esters include methyl formate, methyl acetate, and methyl butyrate.

Examples of ethers include 1,3-dioxane, 1,4-dioxane, 1,2-dimethoxyethane, 1,4-dibutoxyethane, and methyl diglyme.

Examples of nitriles include acetonitrile and benzonitrile.

Examples of the nonaqueous solvent include tetrahydrofuran or derivatives thereof, dioxolan or derivatives thereof, ethylene sulfide, sulfolane, and sultone or derivatives thereof.

As the nonaqueous solvent, there is adopted one of the abovementioned materials alone, or a mixture of two or more of the materials, though the nonaqueous solvent is not limited to these materials.

The electrolytic solution may contain electrolytic salt other than $LiPF_6$.

Examples of other electrolytic salts include lithium salts, such as $LiClO_4$, $LiBF_4$, $LiAsF_6$, $LiCF_3SO_3$, $LiN(SO_2CF_3)_2$, $LiN(SO_2C_2F_5)_2$, $LiN(SO_2CF_3)(SO_2C_4F_9)$, $LiSCN$, $LiBr$, $LiI$, $Li_2SO_4$, and $Li_2B_{10}Cl_{10}$. As the electrolytic salt, there is adopted one of the abovementioned materials alone, or a mixture of two or more of the materials, though the electrolytic salt is not limited to these materials.

If any electrolyte other than $LiPF_6$ or a mixture of two or more electrolytes is used, the total concentration of the electrolytic salts in the electrolytic solution is normally 0.5 to 2.0 mol/L.

As shown in FIG. 6 to FIG. 10, the above-described nonaqueous electrolyte secondary battery cell includes a case 7, an excess electrolytic solution 8 contained in the case 7, two outer gaskets 11 attached to outer surfaces of the case 7, an electrode assembly 2 housed in the case 7, two current-collecting units 9 electrically connected to the electrode assembly 2, and two external terminals 10 electrically connected to the two current-collecting units 9.

As shown in FIG. 6, the case 7 includes a case body 7a open toward one direction to house the electrode assembly 2, and a plate-shaped cover plate 7b for closing the opening of the case body 7a. The case body 7a and the cover plate 7b are formed from, for example, an aluminum-based metal material, such as aluminum or aluminum alloy, and welded to each other.

The cover plate 7b is, for example, rectangular in shape when viewed from one surface side thereof. The cover plate 7b is formed so as to air-tightly close the opening of the case body 7a.

Two openings are formed in the cover plate 7b.

The two outer gaskets 11 are attached to outer surfaces of the cover plate 7b. An opening is formed in each outer gasket 11. The cover plate 7b and each outer gasket 11 are disposed so that an opening of the cover plate 7b and the opening of the outer gasket 11 line up. Parts of the external terminals 10 are located inside the respective lined-up openings.

The respective external terminals 10 are connected to two current-collecting units 9 connected to the electrode assembly 2. Each current-collecting unit 9 is electrically connected to the electrode assembly 2. That is, the respective external terminals 10 are electrically connected to the electrode assembly 2 through the two current-collecting units 9.

The external terminals 10 are formed from, for example, an aluminum-based metal material, such as aluminum or aluminum alloy.

The outer gaskets 11, the current-collecting units 9, and the external terminals 10 are respectively provided for a positive electrode and for a negative electrode.

The outer gasket 11, the current-collecting unit 9 and the external terminal 10 for use in a positive electrode are disposed at one end in the longitudinal direction of the cover plate 7b. On the other hand, the outer gasket 11, the current-collecting unit 9 and the external terminal 10 for use in a negative electrode are respectively disposed at the other end in the longitudinal direction of the cover plate 7b.

As shown in FIG. 7 and FIG. 8, the electrode assembly 2 is housed inside the case body 7a of the case 7. A space is formed between the case 7 and the electrode assembly 2.

One electrode assembly 2 or a plurality of electrode assemblies may be housed inside the case 7. In the latter case, the plurality of electrode assemblies are electrically connected in parallel.

In the above-described nonaqueous electrolyte secondary battery 1, the case 7 is disposed so that the cover plate 7b of the case 7 is positioned on the upper side thereof, and the wound electrode assembly 2 is housed inside the case 7, so that the winding axis direction of the electrode assembly 2 is the lateral direction thereof, as shown in, for example, FIG. 7 to FIG. 9. The excess electrolytic solution 8 is reserved within the case 7.

In the nonaqueous electrolyte secondary battery 1 in such a state as described above, at least part of each high-content part 6 disposed along each of the opposed sides of the belt-shaped electrode assembly 2 is in contact with the excess electrolytic solution 8.

Each high-content part 6 in contact with the excess electrolytic solution 8 is larger in the amount of impregnated electrolytic solution than a portion of the high-content part 6 in the electrode assembly 2 not in contact with the excess electrolytic solution 8. Accordingly, a metal compound constituting the active material and an $LiPF_6$-derived acidic substance in the excess electrolytic solution 8 are liable to react with each other in the high-content part 6 in contact with the excess electrolytic solution 8. Since the ratio of lithium carbonate content is higher in the high-content part 6 than in the inner area B, however, the $LiPF_6$-derived acidic substance is all the more securely neutralized due to the high ratio of lithium carbonate content. Consequently, it is possible to suppress or prevent the metal of the active material from being liquated out by the $LiPF_6$-derived acidic substance, even if the high-content part 6 is in contact with the excess electrolytic solution 8.

In the nonaqueous electrolyte secondary battery 1 in such a state as described above, even if the LiPF6-derived acidic substance and lithium carbonate react with each other in each high-content part 6 in contact with the excess electrolytic solution 8, a gas thus generated is likely to move to the excess electrolytic solution 8. That is, the gas is less likely to move into the electrode assembly 2. It is therefore possible to suppress or prevent the generated gas from accumulating inside the electrode assembly 2, even if the high-content parts 6 are comparatively high in the ratio of lithium carbonate content.

On the other hand, the above-described nonaqueous electrolyte secondary battery 1 may be disposed to have a surface of the cover plate 7b of the case 7 facing the lateral direction thereof, as shown in, for example, FIG. 10.

Also in the nonaqueous electrolyte secondary battery 1 in such a state as described above, at least part of each high-content part 6 disposed along each of the opposed sides of the belt-shaped electrode assembly 2 is in contact with the excess electrolytic solution 8.

Accordingly, for the same reason as described above, it is possible to suppress or prevent the metal of the positive-electrode active material from liquating out and a generated gas from accumulating inside the electrode assembly 2.

In the above-described nonaqueous electrolyte secondary battery 1, the case 7 may be disposed to have the cover plate 7b of the case 7 being positioned on the upper side thereof, and the wound electrode assembly 2 may be housed in the case 7 to have the winding axis direction thereof being the up-down direction of the electrode assembly 2.

In the electrode assembly 2, expansion and contraction of the positive electrode 3 and the negative electrode 4 may occur repetitively due to the charge and discharge of the nonaqueous electrolyte secondary battery 1. Since the thickness of each separator 5 varies due to the expansion and contraction of the positive electrode 3 and the negative electrode 4, the amount of electrolytic solution impregnated into the separator 5 may vary. As a result, the amount of electrolytic solution impregnated into the electrode assembly 2 may also vary. This variation may also cause a change in the amount of excess electrolytic solution 8. Consequently, the case 7 may temporarily not retain the excess electrolytic solution 8 due to the charge and discharge of the nonaqueous electrolyte secondary battery 1.

Next, a description is made of a method for manufacturing the above-described electric storage device 1.

The electric storage device 1 is manufactured by a commonly-known method.

In the method for manufacturing the electric storage device 1, there is fabricated, for example, a belt-shaped electrode assembly 2 including two high-content parts 6 disposed along the longitudinal direction, so as to face each other. The electrode assembly 2 thus fabricated and an electrolytic solution are housed in the case 7. The electrode assembly 2 is fabricated, for example, as described below.

The electrode assembly 2 is fabricated by, for example, layering together a sheet-shaped positive electrode 3, a sheet-shaped negative electrode 4, and a sheet-shaped separator 5 disposed between the positive electrode 3 and the negative electrode 4.

The positive electrode 3 is fabricated, for example, as described below.

That is, in the fabrication of the positive electrode 3, a particulate positive-electrode active material, a conductive agent, a binding agent and a thickening agent, for example, are mixed with an organic solvent, such as alcohol or toluene, to prepare a positive-electrode mixture. Subsequently, the positive-electrode mixture is coated on at least one surface side of the sheet-shaped positive-electrode current-collecting base material 3a. Then, the organic solvent is vaporized from the positive-electrode mixture by means of drying to fabricate the positive electrode 3 in which the positive-electrode active material layer 3b is disposed on at least one surface side of the positive-electrode current-collecting base material 3a.

As a method for mixing the positive-electrode active material, the conductive agent, the binding agent, the thickening agent and the like in the fabrication of the positive electrode 3, there is adopted a method, for example, in which the materials are mixed using a powder mixer, such as a V-type mixing machine, an S-type mixing machine, a paddle machine, a ball mill or a planetary ball mill.

A method for coating a current-collecting base material with the positive-electrode mixture in the fabrication of the positive electrode 3 is not limited in particular. For example, roller coating using, for example, an applicator roll, screen coating, blade coating, spin coating, or die coating is adopted as the method.

As the positive-electrode active material, there is adopted, for example, a commercially-available commonly-known material.

The negative electrode 4 is fabricated by, for example, the same method as the above-described method for fabricating the positive electrode 3, except that a particulate negative-electrode active material is used in place of the particulate positive-electrode active material.

That is, in the fabrication of the negative electrode 4, a particulate negative-electrode active material, a binding agent and a thickening agent, for example, are mixed with an organic solvent to prepare a negative-electrode mixture. Thereafter, the negative-electrode mixture is coated on at least one surface side of the sheet-shaped negative-electrode current-collecting base material 4a. Then, the organic solvent is vaporized from the negative-electrode mixture by means of drying to fabricate the negative electrode 4 in which the negative-electrode active material layer 4b is disposed on at least one surface side of the negative-electrode current-collecting base material 4a.

The high-content parts 6 can be formed as described below.

For example, first, two types of positive-electrode mixtures containing lithium carbonate are prepared to have ratios of lithium carbonate content thereof after the organic solvent vaporized being different from each other. Next, the positive-electrode mixture prepared so as to be higher in the ratio of lithium carbonate content is coated on both end portions in the width direction of the belt-shaped positive-electrode current-collecting base material 3a. In addition, the positive-electrode mixture prepared so as to be lower in the ratio of lithium carbonate content is coated on the area between both end portions of the positive-electrode current-collecting base material 3a. Yet additionally, the organic solvent is vaporized from the respective positive-electrode mixtures to form the positive-electrode active material layer 3b. In this way, it is possible to form the high-content parts 6 included in the positive-electrode active material layer 3b.

The two types of positive-electrode mixtures may be coated on the positive-electrode current-collecting base material 3a either simultaneously or separately.

Alternatively, the high-content parts 6 can be formed, for example, as described below.

Particles of lithium carbonate are attached to both end portions in the width direction of the belt-shaped separator 5 to fabricate a lithium carbonate-containing separator 5. Next, such a separator 5 is layered along with the positive electrode 3 and the negative electrode 4 in the same way as described above. In this way, it is possible to form the high-content parts 6 included in the separator 5.

Note that by attaching particles of lithium carbonate to both end portions in the width direction of the belt-shaped negative-electrode current-collecting base material 4a, it is possible to form the high-content parts 6 included in the negative-electrode current-collecting base material 4a in the same way as described above.

The electrode assembly 2 fabricated as described above is, for example, wound and placed in the case body 7a of the case 7.

Subsequently, a cover plate 7b is fitted on the case body 7a in which the electrode assembly 2 is placed. That is, the opening of the case body 7a is closed with the cover plate 7b. Thereafter, an electrolytic solution containing electrolytic salt ($LiPF_6$) and a nonaqueous solvent is injected into the case 7. Part of the electrolytic solution thus injected is impregnated into the electrode assembly 2, and another part of the solution is reserved within the case 7.

Thus, it is possible to manufacture the nonaqueous electrolyte secondary battery 1 as an electric storage device.

While the electric storage device of the present embodiment is as described by way of example above, the present invention is not limited to the electric storage device described above as an example.

That is, various embodiments used in a commonly-known electric storage device may be adopted to the extent of not impairing the advantageous effects of the present invention.

Although in the electric storage device of the present embodiment, $LiPF_6$ is contained in the electrolytic solution, the present invention is not limited thereto. If, for example, a substance containing halogen, such as fluorine or chlorine, is contained in the electrolytic solution, an acidic substance may be generated in the electrolytic solution. Even in such a case, it is possible to adopt the configuration of the present embodiment.

The present invention relates to not only the above-described electric storage device but also an electric storage apparatus including at least one of the above electric storage devices.

An electric storage apparatus 20 of an aspect of the present invention includes, for example, a plurality of the electric storage devices described above as an example. The electric storage apparatus 20 also includes a plurality of busbar members 13 for electrically connecting the electric storage devices to each other or one another.

Figure 11:
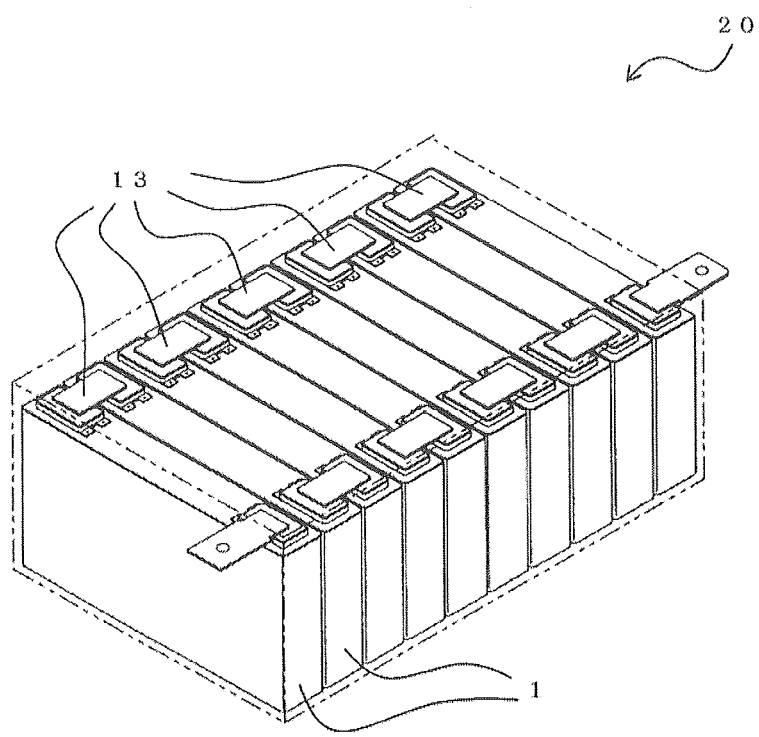
FIG. 11 is a schematic view diagrammatically showing the external appearance of one example of an electric storage apparatus.

FIG. 11 shows one example of the electric storage apparatus 20 of the present embodiment.

In the electric storage apparatus 20 of the present embodiment, a plurality of electric storage devices 1 (nonaqueous electrolyte secondary batteries 1) formed into a rectangular shape in top view, for example, are disposed so as to align in the short-side direction of the electric storage devices 1 when viewed from above.

Adjacent electric storage devices 1 abut on each other.

In the electric storage apparatus 20, electric storage devices 1 adjacent to each other are electrically connected using a single busbar member 13. Thus, the electric storage apparatus 20 is configured so as to be charged and discharged by all of the electric storage devices 1 constituting the module.

EXAMPLES

Next, the present invention is described in further detail by citing examples, though the present invention is not limited to these examples.

Example 1

The electric storage device (lithium-ion secondary battery cell) shown in FIG. 6 was manufactured as described below.
[Fabrication of Positive Electrode]

$LiCoO_2$, polyvinylidene fluoride and acetylene black were mixed into N-methylpyrrolidone at a ratio by mass of 90%, 5% and 5%, respectively, to prepare a positive-electrode mixture. In addition, lithium carbonate ($Li_2CO_3$) and polyvinylidene fluoride were mixed into N-methylpyrrolidone at a ratio by mass of 50% and 50%, respectively, to prepare an $Li_2CO_3$ coating agent.

Then, the positive-electrode mixture was coated on both surface sides of a current-collecting foil (belt-shaped positive-electrode current-collecting base material 90 mm in short-side length and 15 μm in thickness) made from aluminum alloy into a rectangular sheet shape to have an amount of coating being 10 mg/cm² on each side, thereby fabricating a positive electrode including a positive-electrode current-collecting base material and a positive-electrode active material layer.

Note that the above-mentioned $Li_2CO_3$ coating agent was further coated on the surfaces of the end portions of each positive-electrode mixture after being coated (both end portions of the positive-electrode mixture extending along the opposed long sides of the positive-electrode current-collecting base material, each end portion being 10 mm in width from the end edge of the positive-electrode mixture), thereby forming high-content parts ($Li_2CO_3$ content ratio=0.1 mg/cm² in each positive-electrode active material layer).
[Fabrication of Negative Electrode]

Graphite and polyvinylidene fluoride were mixed into N-methylpyrrolidone at a ratio by mass of 90% and 10%, respectively, to prepare a negative-electrode mixture. Then, the negative-electrode mixture was coated on both surface sides of a current-collecting foil (belt-shaped negative-electrode current-collecting base material 92 mm in short-side length and 10 μm in thickness) made from copper alloy to have an amount of coating being 5 mg/cm² on each side, thereby fabricating a negative electrode including a negative-electrode current-collecting base material and a negative-electrode active material layer.
[Preparation of Electrolytic Solution]

$LiPF_6$ was dissolved in a solvent in which ethylene carbonate, dimethyl carbonate and methyl ethyl carbonate were mixed at a ratio by mass of 30%, 20% and 50%, respectively, so as to be 1 mol/L in concentration, to prepare an electrolytic solution.
[Assembly of Battery]

A subassembly in which a polyethylene separator was sandwitched between the positive electrode and the negative electrode was wound to fabricate an electrode assembly. Next, the electrode assembly thus fabricated and the prepared electrolytic solution were housed in a case (120 mm in width, 12.5 mm in depth, and 85 mm in height) made from aluminum alloy and the case was hermetically closed, thereby manufacturing a battery cell having an initial capacity of 5 Ah.

Example 2

A battery was manufactured in the same way as in Example 1, except that the above-described $Li_2CO_3$ coating agent was coated on parts of the negative-electrode mixture coated in the fabrication of the negative electrode, instead of coating the above-described $Li_2CO_3$ coating agent in the fabrication of the positive electrode, to form the high-content parts in the negative electrode.

The $Li_2CO_3$ coating agent was coated only on the portions (parts of the negative-electrode mixture) facing the end portions of the positive-electrode active material layer (both end portions of the positive-electrode mixture extending along the opposed long sides of the positive-electrode current-collecting base material, each end portion being 10 mm in width from the end edge of the positive-electrode active material layer). The ratio of $Li_2CO_3$ content of the high-content parts was 0.1 mg/cm².

Example 3

A battery cell was manufactured in the same way as in Example 1, except that the above-described $Li_2CO_3$ coating agent was coated on parts of the separator, instead of coating the $Li_2CO_3$ coating agent in the fabrication of the positive electrode, to form the high-content parts in the separator.

The $Li_2CO_3$ coating agent was coated only on the portions (parts of the separator) facing the end portions of the positive-electrode active material layer (both end portions of the positive-electrode mixture extending along the opposed long sides of the positive-electrode current-collecting base material, each end portion being 10 mm in width from the end edge of the positive-electrode active material layer). The ratio of $Li_2CO_3$ content of the high-content parts was 0.1 mg/cm².

Example 4

A battery cell was manufactured in the same way as in Example 1, except that the above-described $Li_2CO_3$ coating agent was coated in the fabrication of the positive electrode to have a ratio of $Li_2CO_3$ content of the high-content parts being 0.02 mg/cm².

Example 5

A battery cell was manufactured in the same way as in Example 1, except that the above-described $Li_2CO_3$ coating agent was coated in the fabrication of the positive electrode to have a ratio of $Li_2CO_3$ content of the high-content parts being 0.01 mg/cm².

Example 6

A battery cell was manufactured in the same way as in Example 1, except that the above-described $Li_2CO_3$ coating agent was coated in the fabrication of the positive electrode to have a ratio of $Li_2CO_3$ content of the high-content parts being 0.2 mg/cm².

Example 7

A battery cell was manufactured in the same way as in Example 1, except that the above-described $Li_2CO_3$ coating agent was coated in the fabrication of the positive electrode to have a ratio of $Li_2CO_3$ content of the high-content parts being 0.3 mg/cm$^2$.

Comparative Example 1

A battery cell was manufactured in the same way as in Example 1, except that the above-described $Li_2CO_3$ coating agent was uniformly coated on the entire area of the coated positive-electrode mixture in the fabrication of the positive electrode to have a ratio of $Li_2CO_3$ content being 0.1 mg/cm$^2$.

Comparative Example 2

A battery cell was manufactured in the same way as in Example 1, except that the above-described $Li_2CO_3$ coating agent was not coated and the high-content parts were not formed in the fabrication of the positive electrode.
<Characterization of Battery Performance>
The battery cells manufactured in the respective Examples and Comparative Examples were charged to have a battery voltage being 4.2 V, and then left to stand under high-temperature storage conditions (60° C. environment) for one month to measure battery capacity and AC resistance.
[Battery Capacity]
Battery capacity after high-temperature storage was calculated as a relative value, with initial battery capacity before high-temperature storage defined as 100%. Table 1 shows the results of measurement.
[AC Resistance]
AC resistance at 1 kHz was measured to calculate AC resistance after high-temperature storage as a relative value, with initial AC resistance before high-temperature storage defined as 100%. Table 1 shows the results of measurement.

TABLE 1

| | Battery Cell Capacity after High-temperature Storage (Initial Value: 100%) | Battery Cell Resistance after High-temperature Storage (Initial Value: 100%) |
|---|---|---|
| Example 1 | 90% | 115% |
| Example 2 | 88% | 125% |
| Example 3 | 89% | 120% |
| Example 4 | 88% | 120% |
| Example 5 | 82% | 120% |
| Example 6 | 90% | 125% |
| Example 7 | 88% | 135% |
| Comparative Example 1 | 89% | 150% |
| Comparative Example 2 | 80% | 120% |

As is understood from the results shown Table 1 (results of Comparative Example 1 in particular), the distance between the positive electrode and the negative electrode that face each other is considered to increase if a gas is generated inside an electrode assembly, in which a positive electrode, a negative electrode and a separator are closely layered, by the reaction between an $LiPF_6$-derived acidic substance and $Li_2CO_3$. Consequently, battery cell resistance after high-temperature storage is assumed to become comparatively high.

Having thus described the embodiments and examples of the present invention, the present invention is not limited to the above-described embodiments and examples. Design changes to be made as appropriate by appropriately combining characterizing portions of the respective embodiments and examples have been assumed from the beginning. Working effects of the present invention are not limited to the above-described embodiments, either.

That is, the embodiments disclosed herein should be considered only as illustrative and not restrictive in all aspects. The scope of the present invention is not shown by the foregoing description but by the claims appended hereto. In addition, it is intended that all modifications equivalent in significance and extent to the appended claims are included in the scope of the present invention.

What is claimed is:

1. An electric storage device comprising:
an electrode assembly; and
an electrolytic solution at least part of which is impregnated into the electrode assembly, wherein
the electrode assembly includes, as electrode assembly forming members, at least a positive electrode and a negative electrode that face each other and contains lithium carbonate,
the electrolytic solution contains at least lithium hexafluorophosphate,
at least one of the positive electrode and the negative electrode includes an active material layer containing a metal compound,
the active material layer includes a peripheral area and an inner area inside the peripheral area,
the electrode assembly includes a high-content part the ratio of lithium carbonate content of which is higher than that of the inner area, and
the high-content part is formed in at least part of the peripheral area of the active material layer.

2. The electric storage device according to claim 1, further comprising a case housing the electrode assembly therein, wherein
an excess electrolytic solution serving as part of the electrolytic solution is reserved within the case, and at least part of the high-content part is in contact with the excess electrolytic solution.

3. The electric storage device according to claim 1, wherein
the positive electrode includes a positive-electrode active material layer serving as the active material layer, and
the high-content part is formed in at least part of the peripheral area of the positive-electrode active material layer.

4. The electric storage device according to claim 1, wherein the ratio of lithium carbonate content of the high-content part is 0.02 mg/cm$^2$ or higher but no higher than 0.2 mg/cm$^2$.

5. The electric storage device according to claim 1, wherein
the electrode assembly is rectangular in shape when viewed from one side thereof and includes a pair of high-content parts, and
the pair of high-content parts are respectively disposed along opposed sides of the electrode assembly.

6. The electric storage device according to claim 1, wherein the peripheral area of the active material layer is an area, greater than 0 and 10 mm or less in width, extending inward from the peripheral edges of the active material layer.

7. An electric storage apparatus comprising:
an electric storage device according to claim 1; and
a busbar member electrically connected to the electric storage device.

8. An electric storage device comprising:
an electrode assembly; and
an electrolytic solution at least part of which is impregnated into the electrode assembly, wherein
the electrode assembly includes, as electrode assembly forming members, at least a positive electrode and a negative electrode that face each other and contains lithium carbonate,
the electrolytic solution contains at least lithium hexafluorophosphate, at least one of the positive electrode and the negative electrode includes an active material layer containing a metal compound, the active material layer includes a peripheral area and an inner area inside the peripheral area, the electrode assembly includes a high-content part the ratio of lithium carbonate content of which is higher than that of the inner area, and the high-content part is formed in at least part of the electrode assembly forming members of the electrode assembly facing the peripheral area of the active material layer in a layer thickness direction thereof.

9. The electric storage device according to claim 8, further comprising a case housing the electrode assembly therein, wherein an excess electrolytic solution serving as part of the electrolytic solution is reserved within the case, and at least part of the high-content part is in contact with the excess electrolytic solution.

10. The electric storage device according to claim 8, wherein the ratio of lithium carbonate content of the high-content part is 0.02 mg/cm$^2$ or higher but no higher than 0.2 mg/cm$^2$.

11. The electric storage device according to claim 8, wherein the electrode assembly is rectangular in shape when viewed from one side thereof and includes a pair of high-content parts, and the pair of high-content parts are respectively disposed along opposed sides of the electrode assembly.

12. The electric storage device according to claim 8, wherein the peripheral area of the active material layer is an area, greater than 0 and 10 mm or less in width, extending inward from the peripheral edges of the active material layer.

13. An electric storage apparatus comprising:

an electric storage device according to claim 8; and a busbar member electrically connected to the electric storage device.

* * * * *